(12) United States Patent
Moseley et al.

(10) Patent No.: US 10,936,110 B1
(45) Date of Patent: Mar. 2, 2021

(54) TOUCHSCREEN CURSOR OFFSET FUNCTION

(71) Applicant: Rockwell Collins, Inc., Cedar Rapids, IA (US)

(72) Inventors: William N. Moseley, Fairfax, IA (US); James K. Weighton, Central City, IA (US); John Sklarsky, III, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/136,660

(22) Filed: Sep. 20, 2018

(51) Int. Cl.
*G09G 5/00* (2006.01)
*G06F 3/041* (2006.01)
*G06F 3/044* (2006.01)
*G06F 3/0484* (2013.01)
*G06F 3/0481* (2013.01)
*G06F 3/0488* (2013.01)

(52) U.S. Cl.
CPC .......... *G06F 3/0416* (2013.01); *G06F 3/044* (2013.01); *G06F 3/0412* (2013.01); *G06F 3/0488* (2013.01); *G06F 3/04812* (2013.01); *G06F 3/04842* (2013.01)

(58) Field of Classification Search
CPC .. G06F 3/0488; G06F 3/04812; G06F 3/0416; G06F 3/0412; G06F 3/044; G06F 3/04842

USPC .................................. 345/168, 173; 715/856
See application file for complete search history.

(56) References Cited

U.S. PATENT DOCUMENTS

| 2006/0244735 | A1* | 11/2006 | Wilson | G06F 3/0488 345/173 |
| 2012/0242581 | A1* | 9/2012 | Laubach | G06F 3/04812 345/168 |
| 2014/0040833 | A1* | 2/2014 | McLean | G06F 3/0488 715/856 |

\* cited by examiner

*Primary Examiner* — Abdul-Samad A Adediran
(74) *Attorney, Agent, or Firm* — Suiter Swantz pc llo

(57) ABSTRACT

A touchscreen display device may include a touchscreen display and a controller. The controller may receive a display map of the touchscreen display dividing the touchscreen display into two or more display zones and defining offset angles for each of the two or more display zones. The controller may further detect a touch input at a touch point on the touchscreen display. The controller may further display a cursor comprising graphical objects on the touchscreen display to visualize a selection point separated from the touch point by an offset distance from the touch point and oriented at an offset angle defined by the cursor display map. The controller may further dynamically update the offset angle of the cursor based on the cursor display map when the touch point enters any of the two or more display zones.

18 Claims, 8 Drawing Sheets

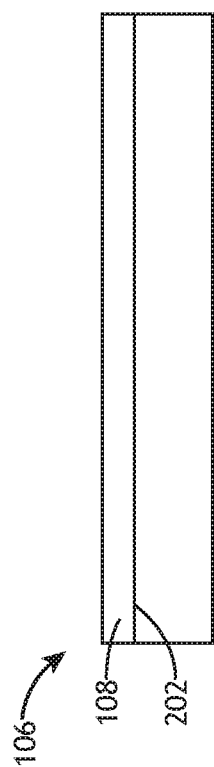
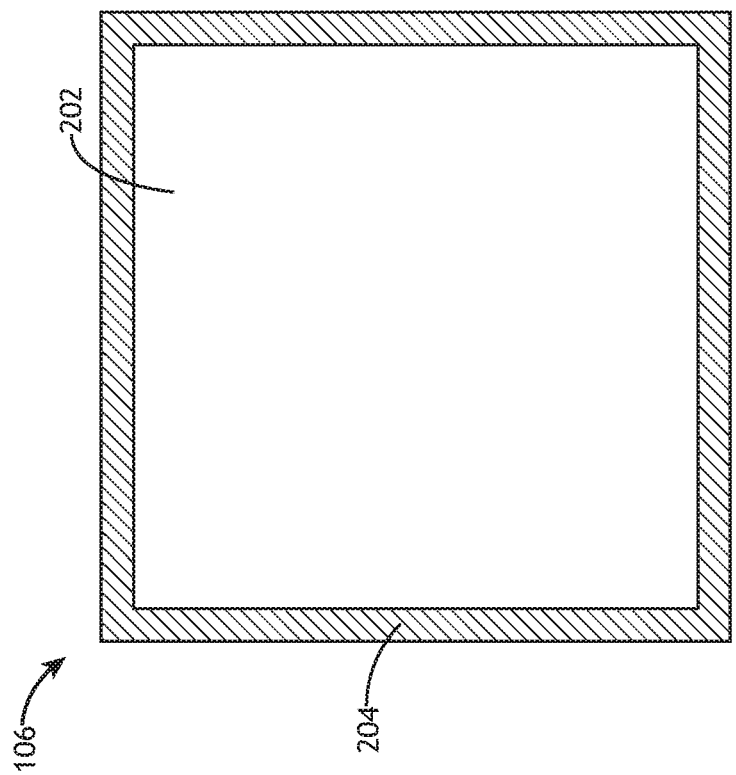
FIG. 2B
FIG. 2A

TOUCHSCREEN CURSOR OFFSET FUNCTION

BACKGROUND

Touchscreen displays provide an intuitive interface for interacting with visual content. However, the input device (e.g., a finger or a stylus) typically obscures a touch point, which may impair the ability of a user to precisely select or otherwise interact with displayed content. This problem is particularly relevant for applications in which a user is wearing gloves, which may further obscure portions of the display and/or may have a broader touch point. For example, many military aviation applications require aviators to wear gloves during flight, which may interfere with the aviator's ability to precisely interact with visual content such as, but not limited to, maps on a touchscreen display.

SUMMARY

In one aspect, embodiments of the inventive concepts disclosed herein are directed to a touchscreen display device. The touchscreen display device may include a touchscreen display and a controller. The controller may receive a cursor display map of the touchscreen display dividing the touchscreen display into two or more display zones and defining offset angles for each of the two or more display zones. The controller may further detect a touch input at a touch point on the touchscreen display. The controller may further display a cursor including graphical objects on the touchscreen display to visualize a selection point separated from the touch point by an offset distance from the touch point and oriented at an offset angle as defined by the cursor display map. The controller may further dynamically update the offset angle of the cursor based on the cursor display map when the touch point enters any of the two or more display zones.

In a further aspect, embodiments of the inventive concepts disclosed herein are directed to a multi-touch touchscreen display device. The multi-touch display device may include a touchscreen display and a controller. The controller may receive a cursor display map of the touchscreen display dividing the touchscreen display into two or more display zones separated by transition zones and defining offset directions for each of the two or more display zones. The controller may further detect a touch input at two touch points on the touchscreen display. The controller may further display a cursor including graphical objects on the touchscreen display to visualize a selection point separated from the two touch points. For example, the selection point may be located equidistant from the two touch points and separated from a midpoint between the two touch points by an offset distance and in a lateral offset direction defined by the cursor display map. The controller may further dynamically update the offset direction of the cursor based on the cursor display map when the touch point enters any of the two or more display zones.

In a further aspect, embodiments of the inventive concepts disclosed herein are directed to a method for providing an offset cursor. The method may include receiving a cursor display map of a touchscreen display dividing the touchscreen display into two or more display zones and defining offset angles for each of the two or more display zones. The method may further include detecting a touch input at a touch point on the touchscreen display. The method may further include displaying a cursor comprising one or more graphical objects on the touchscreen display to visualize a selection point separated from the touch point by an offset distance and oriented at an offset angle defined by the cursor display map. The method may further include updating the offset angle of the cursor dynamically based on the cursor display map when the touch point enters any of the two or more display zones.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2A is a top view of a display element configured in accordance with one or more embodiments of the inventive concepts disclosed herein;

FIG. 2B is a side view of a display element configured in accordance with one or more embodiments of the inventive concepts disclosed herein;

DETAILED DESCRIPTION

Figure 1:
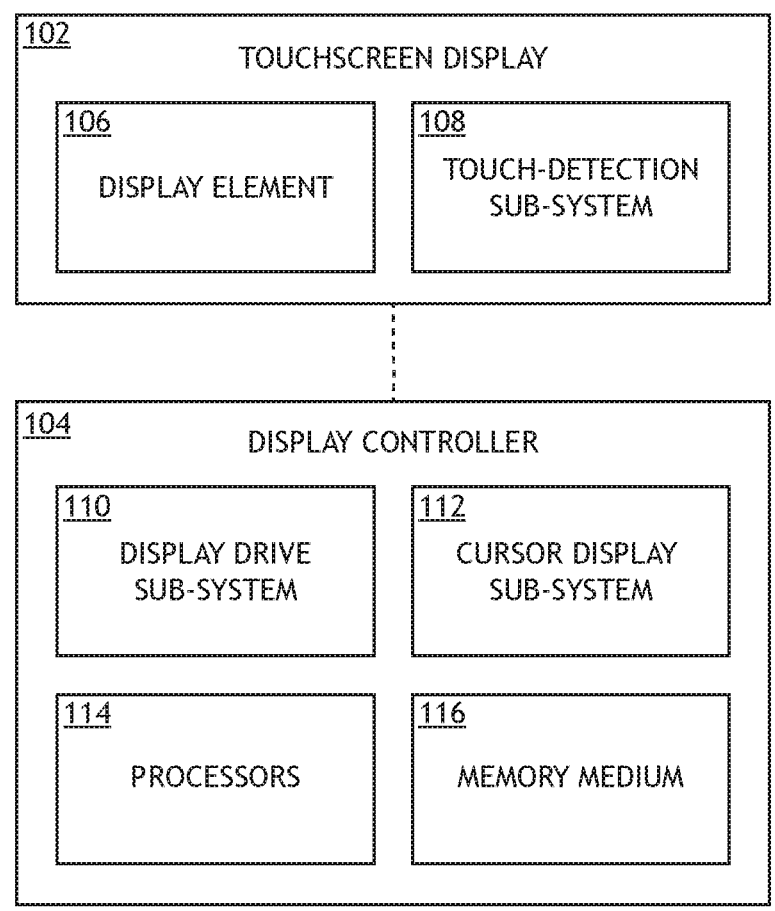
FIG. 1 is a conceptual view of a touchscreen display system configured in accordance with one or more embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with inventive concepts disclosed herein are directed to a touchscreen display system providing a touchscreen display having cursor (e.g., one or more graphical objects) displayed in response to a touch input, where the cursor provides a visual indication of a selection point that is offset from a touch point. In this regard, the selection point may not be obscured by an input device (e.g., a finger or a stylus) during a touch input, which may provide fine control over the selection point and thus fine control for interaction with displayed content.

A touch point may include a region of a touchscreen display (e.g., one or more pixels) at which user input is detected. Further, a selection point may include a region of the touchscreen display (e.g., one or more pixels) associated with user interaction with displayed content. For example, a user may select, grab, translate, and/or manipulate displayed content on the touchscreen device located at the selection point. In accordance with inventive concepts disclosed herein, the selection point of the touchscreen display may be spatially offset from the touch point such that a user may precisely visualize the selection point during a touch input.

In some embodiments, the touchscreen display system includes a cursor display sub-system for displaying the cursor on the display to provide visual feedback to the user based on a touch input. For example, cursor display sub-system may overlay the cursor on the displayed content such that a first portion of the cursor is dynamically located at the touch point as touch point moves across the touchscreen display. Further, a second portion of the cursor may visually indicate the selection point at a location different than (e.g., offset from) the touch point.

In some embodiments, an angle at which the selection point of the cursor is offset from the touch point (e.g., an offset angle) is dynamically modified based on position of the touch point on the touchscreen display in order to facilitate selection of display objects at the edges of the touchscreen display. For example, a cursor having a selection point separated from the touch point by an offset distance by a static offset angle defined by an angle of 90 degrees counterclockwise from a vertical reference direction may not be suitable for selection of a right edge of the touchscreen device. In particular, a region the width of the offset distance on the right edge of the touchscreen would be potentially inaccessible to the user. Accordingly, in some embodiments, a touchscreen display system in accordance with inventive concepts disclosed herein includes a cursor display map that divides the user-accessible area of the touchscreen display into two or more display fields and further defines offset angles for each of the display fields. In this regard, the cursor display sub-system may dynamically update the offset angle of the cursor based on the cursor display map. For instance, the offset directing of the cursor may be updated based on which of the display fields includes the touch point at a given time.

In some embodiments, the offset angles of the display fields defined by the cursor display map may be selected to orient the selection point away from a central location of the touchscreen display in the direction of the corresponding display fields. In this regard, the location of the selection point may be dynamically updated based on the position of the touch point to a location suitable for selecting an edge of the touchscreen display.

In some embodiments, the cursor display map includes transition zones separating display fields. In this regard, the transition zones may facilitate user interaction with displayed content near boundaries of display zones. For example, the cursor offset angle may remain constant as the touch point moves out of a display zone and into a transition zone and may update once the touch point enters a different display zone. In this regard, the transition zones may provide flexible boundaries between display zones in which the cursor offset angle is based on the direction from which the touch point enters the transition zone. Further, the transition zones may mitigate potential difficulties associated with selection of points at or near boundaries between adjacent display zones.

A touchscreen display system designed in accordance with inventive concepts disclosed herein may further accept multiple simultaneous touch inputs (e.g., multi-touch functionality). In some embodiments, a selection point may be located between two touch points (e.g., along a line equidistant between two touch points) and further offset in a direction defined by the cursor display map as described previously herein. Further, the offset distance in the direction defined by the cursor display map may be adjusted based on the separation distance between the two touch points. In this regard, a user may squeeze two fingers together on the touchscreen display to dynamically adjust the offset distance along the direction defined by the cursor display map. It is recognized herein that such control over the offset distance may facilitate precise control of the selection point.

Referring now to FIG. 1, a conceptual view of a touchscreen display system 100 configured in accordance with one or more embodiments of the inventive concepts disclosed herein is shown. The touchscreen display system 100 may include a touchscreen display 102 for providing a touch-sensitive display environment and a display controller 104 for controlling one or more aspects of the touchscreen display 102 such as, but not limited to, visual content (e.g., image and/or video content) to be displayed on the touchscreen display 102 or one or more cursors providing visual indicators for selection points associated with user interaction with displayed visual content.

In some embodiments, the touchscreen display 102 includes a display element 106 (e.g., a screen) for displaying visual content (e.g., image and/or video content) and a touch-detection sub-system 108 for detecting one or more touch inputs from a user.

The display element 106 may include any type of display technology such as, but not limited to, liquid crystal displays (LCDs), light-emitting diode (LED) displays (e.g., micro LED displays), LED-backlit LCD displays, or organic light-emitting diode (OLED) displays.

The display element 106 may further display visual content at any resolution. Accordingly, the display element 106 may have any number and density of pixels. In this regard, the display element 106 may be, but is not required to be, characterized by any resolution descriptor such as, but not limited to, high-definition, 4K, or 8K. Further, the display element 106 may have any aspect ratio such as, but not limited to, 16:9, 4:3, or 5:4.

Referring now to FIGS. 2A and 2B, a display element 106 configured in accordance with one or more embodiments of the inventive concepts disclosed herein are shown. FIG. 2A is a top view of a display element 106 configured in accordance with one or more embodiments of the inventive concepts disclosed herein. FIG. 2B is a side view of a display element 106 configured in accordance with one or more embodiments of the inventive concepts disclosed herein. The display element 106 may include a display surface 202 defining a region on which visual content is displayed. In some cases, the display element 106 may include a bezel 204 around one or more edges of the display surface 202.

The touch-detection sub-system 108 may include any type of touch-detection sub-system 108 sensitive to touch inputs by one or more user input devices. Further, as illustrated in FIG. 2B, the touch-detection sub-system 108 may be, but is not required to be, located on or over the display element 106.

In one embodiment, the touch-detection sub-system 108 includes components to implement resistive touchscreen input measurements. For example, the touch-detection sub-system 108 may include a flexible resistive panel including physically separated optically-transparent electrically-conductive layers (e.g., indium-tin-oxide (ITO) layers) and overlaid on the display element 106. In this regard, touch inputs may be based on contact between the electrically-conductive layers induced by deformation of the resistive panel by a user input device. It is recognized herein that a touch-detection sub-system 108 implementing resistive touchscreen input measurements may be well-suited for but not limited to applications utilizing a rigid stylus or applications requiring a user to wear gloves such as certain military applications.

In another embodiment, the touch-detection sub-system 108 includes components to implement capacitive touchscreen input measurements. For example, the touch-detection sub-system 108 may include a rigid capacitive panel including physically separated optically-transparent electrically-conductive layers (e.g., indium-tin-oxide (ITO) layers) covered by a rigid optically-transparent cover (e.g., a glass cover) and overlaid on the display element 106. In this regard, the capacitive panel may detect user input based on modifications of capacitance between the separated electrically-conductive layers. It is recognized herein that capacitive panels may provide high durability and accuracy, but may require user input from a finger, capacitive gloves, or a capacitive stylus.

It is to be understood that the examples provided herein of a touch-detection sub-system 108 are provided solely for illustrative purposes and should not be interpreted as limiting. A touch-detection sub-system 108 may include any components known in the art suitable for recognizing touch inputs using any technique such as, but not limited to, infrared touchscreen input measurements, optical imaging touchscreen input measurements, surface-acoustic wave (SAW) touchscreen input measurements, or acoustic pulse recognition (ACR) touchscreen input measurements.

Further, the touch-detection sub-system 108 may define an active area on which touch inputs may be recognized. The active area may be, but is not required to be, matched to the dimensions of the display surface 202. In some embodiments, the active area may extend beyond the display surface 202. For example, the active area may extend into a bezel 204 along one or more edges of the display surface 202. In some cases, an active area extending beyond the display surface 202 may facilitate precise detection of touch inputs near the edges of the display surface 202.

Referring again to FIG. 1, the display controller 104 may include any number of components suitable for driving the touchscreen display 102.

In some embodiments, the display controller 104 includes display drive sub-system 110 for directing the display element 106 to display visual content. For the example, the display drive sub-system 110 may include circuitry for rendering image and/or video content on pixels of the display element 106.

In some embodiments, the display controller 104 includes a cursor display sub-system 112 for displaying a cursor on the display element 106 having a selection point offset from one or more touch points. A cursor provided by the cursor display sub-system 112 may include one or more graphical objects having features providing visual feedback to the user regarding the location of a selection point at which the user may select or otherwise manipulate displayed visual content on the display element 106.

In some embodiments, the cursor display sub-system 112 is communicatively coupled to the touch-detection sub-system 108 of the touchscreen display 102 as well as the display drive sub-system 110. In this regard, the cursor display sub-system 112 may receive locations of one or more touch points from the touch-detection sub-system 108, determine a location of the selection point offset from the one or more touch points, and direct the display drive sub-system 110 to render a cursor (e.g., a graphical object) on the display element 106 to provide the visual indication of the selection point. For example, the cursor display sub-system 112 may direct the display drive sub-system 110 to overlay the cursor over additional displayed content. Further, the cursor display sub-system 112 may provide (e.g., direct the display drive sub-system 110 to render) a cursor having any transparency value. For example, an opaque cursor overlaid on displayed content may completely block the underlying displayed content, whereas a partially transparent cursor may provide for a filtered display of the underlying displayed content. In this regard, the underlying displayed content may be dimmed, shaded, and/or filtered with a color associated with the cursor.

Further, the touchscreen display system 100 may actuate a user selection (e.g., a click) at the selection point through any technique known in the art. In some embodiments, the touchscreen display system 100 actuates a user selection upon release of a touch input (e.g., by removing the user input device from the display element 106). In some embodiments, the touchscreen display system 100 actuates a user selection by actuating a button external to the display element 106.

In some embodiments, the display controller 104 includes one or more processors 114 configured to execute program instructions maintained on a memory medium 116. In this regard, the one or more processors 114 may execute any of the various process steps described throughout the present disclosure.

The one or more processors 114 may include any processing element known in the art. In this sense, the one or more processors 114 may include any microprocessor-type device configured to execute algorithms and/or instructions. In one embodiment, the one or more processors 114 may consist of an image computer, parallel processor, or any other computer system configured to execute a program configured to operate the touchscreen display system 100, as described throughout the present disclosure. It is further recognized that the term "processor" may be broadly defined to encompass any device having one or more processing elements, which execute program instructions from a non-transitory memory medium 116. Further, the steps described throughout the present disclosure may be carried out by a single processor 114 or, alternatively, multiple processors 114.

The processors 114 and/or the memory medium 116 may be integrated and/or coupled to any component of the touchscreen display system 100 such as, but not limited to, the display drive sub-system 110 or the cursor display sub-system 112. For example, the cursor display sub-system 112 may include and/or utilize the processors 114 to determine a selection point based on one or more touch points. Additionally, multiple processors 114 may be housed in a common housing or within multiple housings. In this way, processors 114, along with additional components of the touchscreen display system 100 may be packaged together or may be separately packaged as module suitable for integration into touchscreen display system 100.

The memory medium 116 may include any storage medium known in the art suitable for storing program instructions executable by the associated one or more processors 114. For example, the memory medium 116 may include a non-transitory memory medium. By way of another example, the memory medium 116 may include, but is not limited to, a read-only memory ROM), a random-access memory (RAM), a magnetic or optical memory device (e.g., disk), a magnetic tape, or a solid-state drive. It is further noted that memory medium 116 may be housed in a common controller housing with the one or more processors 114. In one embodiment, the memory medium 116 may be located remotely with respect to the physical location of the one or more processors 114. For instance, the one or more processors 114 may access a remote memory (e.g., server), accessible through a network (e.g., internet, intranet, and the like). Therefore, the above description should not be interpreted as a limitation on the present invention but merely an illustration.

The touchscreen display 102 may display visual content from any source. In some embodiments, the visual content is stored on a memory device (e.g., the memory medium 116) and retrieved for playback. In some embodiments, the visual content is streamed from a remote source (e.g., a remote server).

Figure 3A:
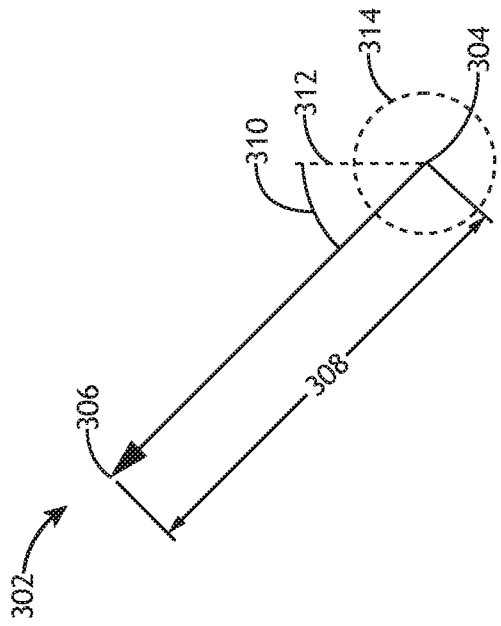
FIG. 3A is a schematic view of a cursor providing a visualization of a selection point offset from a single touch point without providing visual indication of the touch point configured in accordance with one or more embodiments of the inventive concepts disclosed herein.
Figure 3B:
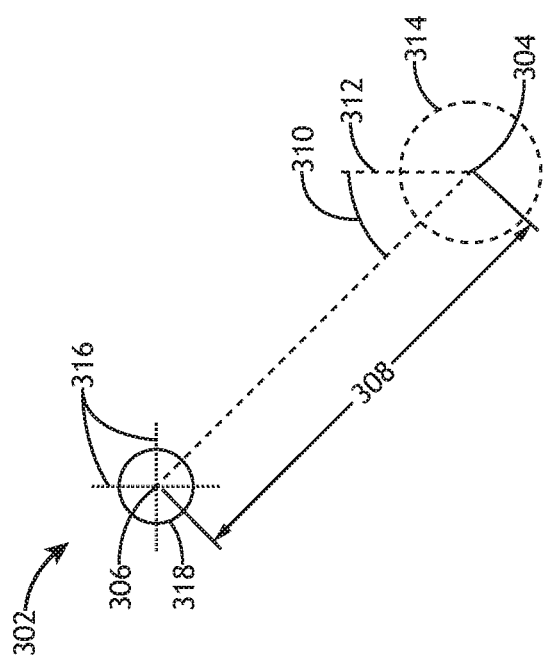
FIG. 3B is a schematic view of a cursor providing a visualization of both a single touch point and a selection point offset from the touch point configured in accordance with one or more embodiments of the inventive concepts disclosed herein.

Referring now to FIGS. 3A-3B, a cursor 302 providing a visual indication of a selection point offset from a single touch point is described in greater detail. In accordance with inventive concepts disclosed herein, a user may interact with a touchscreen display system 100 by touching the display element 106 at one or more locations (e.g., one or more touch points 304) with one or more user input devices, which may be detected with the touch-detection sub-system 108. As described previously herein, suitable user input devices may vary depending on the touch-detection sub-system 108 and may include, but are not limited to, fingers of a user or a stylus. Further, multiple touch points may be detected simultaneously such that the touchscreen display system 100 may provide multitouch operations.

Upon detection of a touch point 304, the cursor display sub-system 112 may then determine a location of a selection point 306 offset from the one or more touch points 304 such that the selection point 306 may not be obscured by user input devices during the touch input. The cursor display sub-system 112 may further generate a cursor 302 including graphical objects to provide a visual indication of the selection point 306 and/or the one or more touch points 304 for display on the display element 106.

The cursor 302 may be comprised of graphical objects of any shape or transparency. FIGS. 3A and 3B illustrate cursors 302 providing a visualization of a selection point 306 offset from a single touch point 304 in accordance with inventive concepts disclosed herein.

The offset between a selection point 306 of a cursor 302 and a touch point 304 may be characterized by any metric known in the art. In some embodiments, a selection point 306 is separated from a touch point 304 by an offset distance 308 and oriented at an offset angle 310. For example, an offset angle 310 may be measured from a reference direction 312. The reference direction 312 may correspond to any direction on the display element 106 such as, but not limited to, a vertical direction defined according to a typical user view.

The selection point 306 may represent a pixel or group of pixels associated with a location on the display element 106 at which the user may interact with displayed content. For example, the selection point 306 may correspond to a point on the display element 106 at which a user may select, highlight, or otherwise manipulate associated displayed content.

A touch point 304 may represent a pixel or group of pixels associated with a location on the display element 106 at which a touch input is recognized (e.g., by the touch-detection sub-system 108). It is recognized herein that a physical size of a user input device (e.g., a finger or a stylus) may typically be larger than a single pixel such that a user input covers a region of a display element 106 (e.g. a touch zone 314). Further, the size, shape, and/or orientation of the touch zone 314 may change as the user interacts with the display element 106. In some embodiments, a single touch point 304 may be defined to represent a given touch zone 314 using any technique known in the art. For example, a touch point 304 may be defined based on a center of mass of a touch zone 314. By way of another example, a touch point 304 may be defined as a center of a circle having a minimum size necessary to enclose the touch zone 314.

A cursor 302 may include any number of graphical objects suitable for visualizing the selection point 306. Further, a cursor 302 may include, but is not required to include, any number of graphical objects suitable for visualizing a touch point 304.

FIG. 3A is a schematic view of a cursor 302 providing a visualization of a selection point 306 offset from a single touch point 304 without providing visual indication of the touch point 304 configured in accordance with one or more embodiments of the inventive concepts disclosed herein. A selection point 306 may be visualized using any technique known in the art. For example, as illustrated in FIG. 3A, a selection point 306 may be visualized by the intersection of cross-hairs 316. By way of another example, a selection point 306 may be visualized as the center of a selection shape 318, which may include any shape such as, but not limited to, a circle (as illustrated in FIG. 3A), a triangle, a square, or a hexagon. Further, the selection shape 318 may have any degree of transparency to facilitate the visualization of displayed content at the location of the selection point 306. In some embodiments, the selection shape 318 includes an outline with a fully transparent interior.

FIG. 3B is a schematic view of a cursor 302 providing a visualization of both a single touch point 304 and a selection point 306 offset from the touch point 304 configured in accordance with one or more embodiments of the inventive concepts disclosed herein. A touch point 304 may be visualized using any technique known in the art. In some embodiments, as illustrated in FIG. 3B, a cursor 302 includes a line or an arrow pointing from a touch point 304 to the selection point 306.

Figure 4:
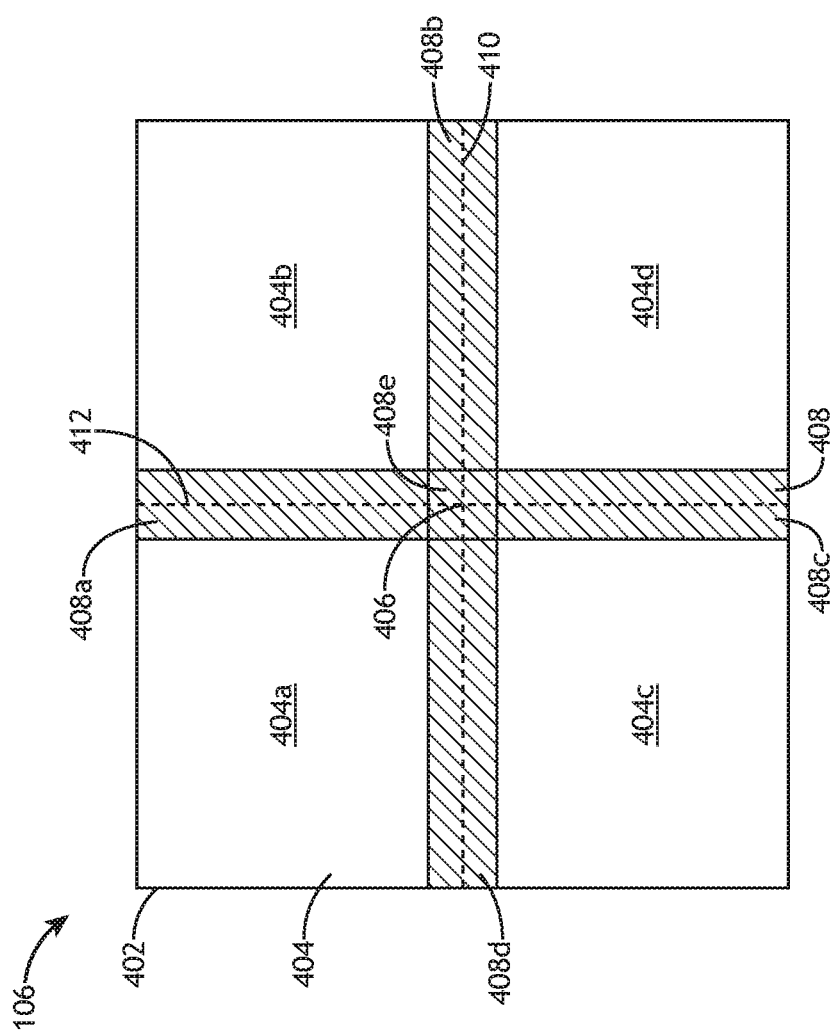
FIG. 4 is a display map associated with a display element configured in accordance with one or more embodiments of the inventive concepts disclosed herein.

Referring now to FIG. 4, a display map 402 associated with a display element 106 configured in accordance with one or more embodiments of the inventive concepts disclosed herein is shown. In some embodiments, the display map 402 defines an active area of the display element 106 element into display fields 404. For example, as illustrated in FIG. 4, a display map 402 may represent the display element 106 as four display fields 404a-404d. It is to be understood, however, that the illustration of a display map 402 including four display fields 404 is provided merely for illustrative purposes and that a display map 402 may define any number of display fields 404 oriented in any pattern. For example, the display map 402 may divide the active area of the display element 106 into a grid of equal or unequal sized display fields 404.

The display map 402 may define one or more aspects of the cursor 302 for each of the display fields 404 such that the cursor 302 may dynamically update based upon the locations of touch inputs (e.g., a location of a touch point 304) with respect to the display map 402. For example, graphical objects of the cursor 302 used to visualize the relationship between the selection point 306 and/or one or more touch points 304 may be defined for each of the display fields 404.

Figure 5:
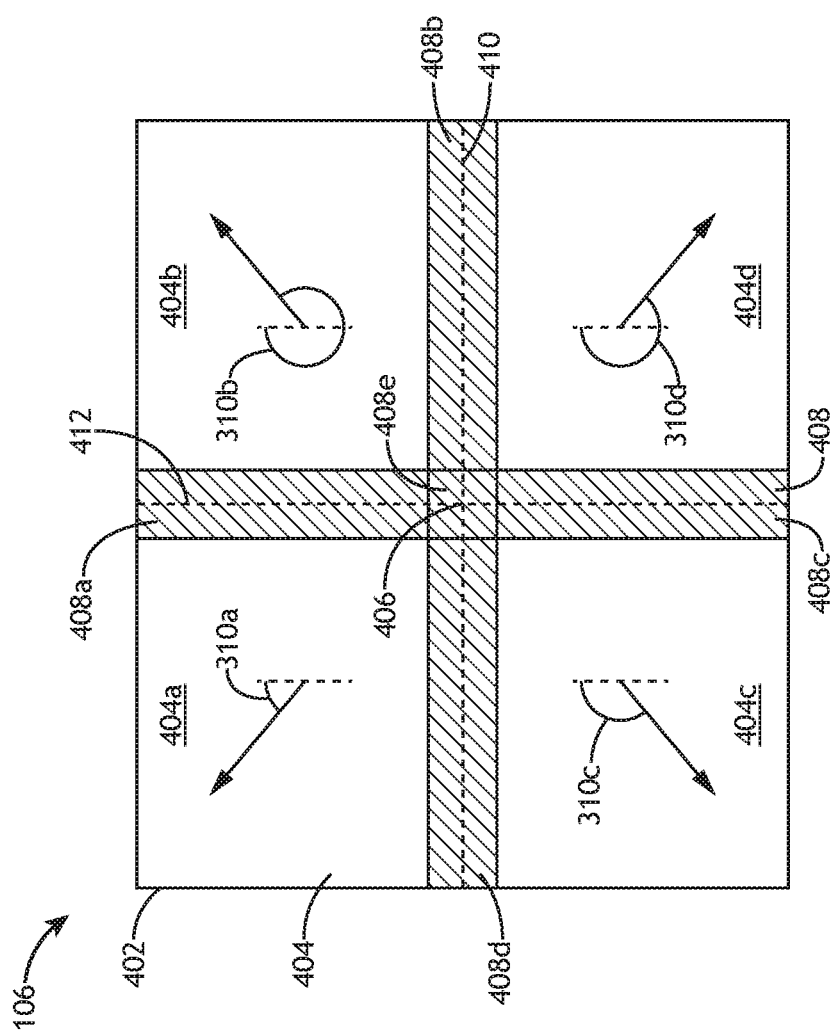
FIG. 5 is the display map of FIG. 4 illustrating different offset angles for each of the four display fields configured in accordance with inventive concepts disclosed herein.

In some embodiments, the display map 402 defines the offset angle 310 for each of the display fields 404. FIG. 5 is the display map 402 of FIG. 4 illustrating different offset angles 310a-310d for each of the four display fields 404-404d configured in accordance with inventive concepts disclosed herein. For example, a first display field 404a may define a first offset angle 310a, a second display field 404b may define a second offset angle 310b, a third display field 404c may define a third offset angle 310c, and a fourth display field 404d may define a fourth offset angle 310d. Accordingly, the offset angle 310 of the cursor 302 (e.g., as illustrated in FIGS. 3A and 3B) may dynamically update to a value defined by the display map 402 (e.g., one of offset angles 310a-310d) based on which display field (e.g., which of display fields 404a-404d) includes the touch point 304.

For instance, a touch input initiated in display field 404a may generate a cursor 302 having a selection point 306 offset by the touch point 304 by offset angle 310a. If the touch point 304 is translated into display field 404b (e.g., by the user sliding the user input device along the display element 106), the cursor 302 may dynamically update to provide the selection point 306 offset by the touch point 304 by offset angle 310b.

In some embodiments, the offset angles 310 for each of the display fields 404 (e.g., offset angles 310a-310d) may be defined to point outward from a center point 406 of the display map 402. In this regard, edges of the display element 106 may be accessible by the selection point 306 of the cursor 302 and further visualized by the user.

In some embodiments, the display map 402 may further include one or more transition zones 408 separating the display fields 404 to facilitate user interaction with displayed content near boundaries of display fields 404. For example, referring to FIG. 4, the display map 402 may include transition zones 408a-408d located between display fields 404a-404d (e.g., centered on a horizontal centerline 410 and a vertical centerline 412) and a central transition zone 408e located near the center point 406.

The relationship between the selection point 306 and the touch point 304 may vary according to any selected manner in the transition zones 408.

Continuing but not limited to the example above where the offset angle 310 of the cursor 302 is defined for each of the display fields 404, in some embodiments, the offset angle 310 may remain constant as the touch point 304 moves out of a display field 404 (e.g., any of display fields 404a-404d) and into a transition zone 408 (e.g. any of transition zones 408a-408e). The offset angle 310 may update once the touch point 304 enters a different display field 404. In this regard, the transition zones may provide flexible boundaries between display fields 404 in which the offset angle 310 in a transition zone 408 is based on the direction from which the touch point 304 enters the transition zone 408. Further, the dimensions of the transition zones 408 may be larger than the dimensions of the cursor 302 such that the cursor 302 may fit within the transition zones 408. It is recognized herein that this configuration may facilitate the placement of a selection point 306 near edges of the display fields 404 without any change of the offset angle 310.

In some embodiments, the cursor display sub-system 112 may dynamically update the offset angle 310 when the touch point 304 is within a transition zone 408. For example, in a transition zone 408, the offset angle 310 may smoothly transition between values of adjacent display fields 404. Considering the above example, in the case that a touch point 304 transitions from display field 404a to display field 404b through transition zone 408a, the offset angle 310 of the cursor 302 may gradually shift from offset angle 310a to offset angle 310b in the transition zone 408a based on the location of the touch point 304 in the transition zone 408a relative to the boundaries of the display field 404a and the display field 404b.

Further, the transition behavior may be the same for all transition zones 408 or may vary for different transition zones 408. For example, transition zones between corners of display fields 404 (e.g., transition zone 408e) may provide different transition behavior than transition zones between edges of display fields 404 (e.g., transition zones 408a-408d). For instance, it may be the case that gradually shifting the offset angle 310 in transition zones between corners of display fields 404 may lead to a decrease in the offset distance 308 such that the selection point 306 may be at least partially obscured due by the user input device. Accordingly, in some embodiments, the offset angle 310 may remain constant as the touch point 304 moves into a transition zone between corners of display fields 404 (e.g., transition zone 408e) and may update once the touch point 304 enters a different display fields 404 as described above. Further, the transition behavior in remaining transition zones 408 may have any desired behavior.

It is to be understood that the descriptions of a display map 402 defining offset angles 310 for different display fields 404 above based on a single touch point 304 is provided solely for illustrative purposes and should not be interpreted as limiting. Rather, as described previously herein, the touchscreen display system 100 may accept multiple simultaneous touch inputs. Further, the display map 402 may define any aspect of the relationship between a selection point 306 and any touch points 304 for different display fields 404.

Figure 6:
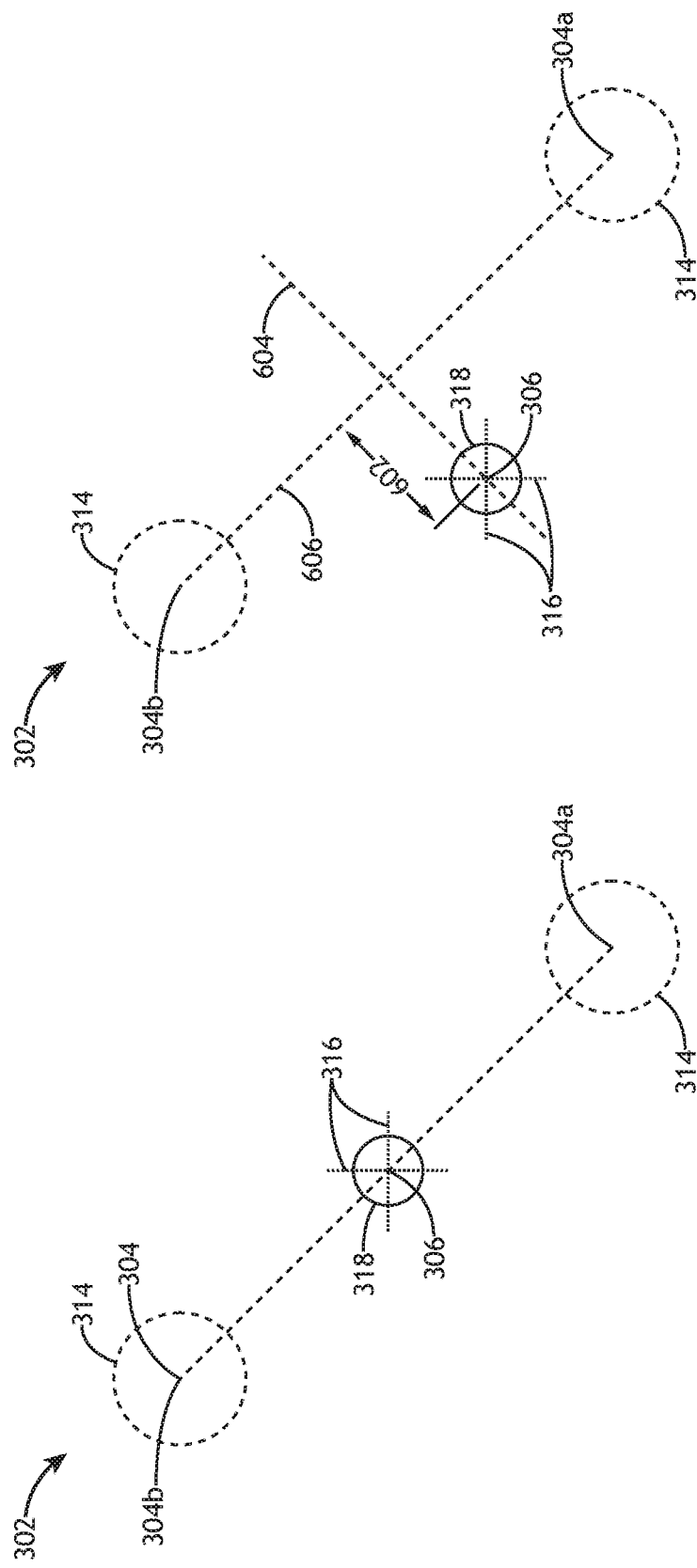
FIG. 6A is a schematic view of a cursor providing visualization of a selection point offset from two touch points in accordance with inventive concepts disclosed herein.
FIG. 6B is a schematic view of a cursor providing visualization of a selection point 306 offset from two touch points and further including a map-dependent lateral offset distance configured in accordance with inventive concepts disclosed herein.
Figure 7:
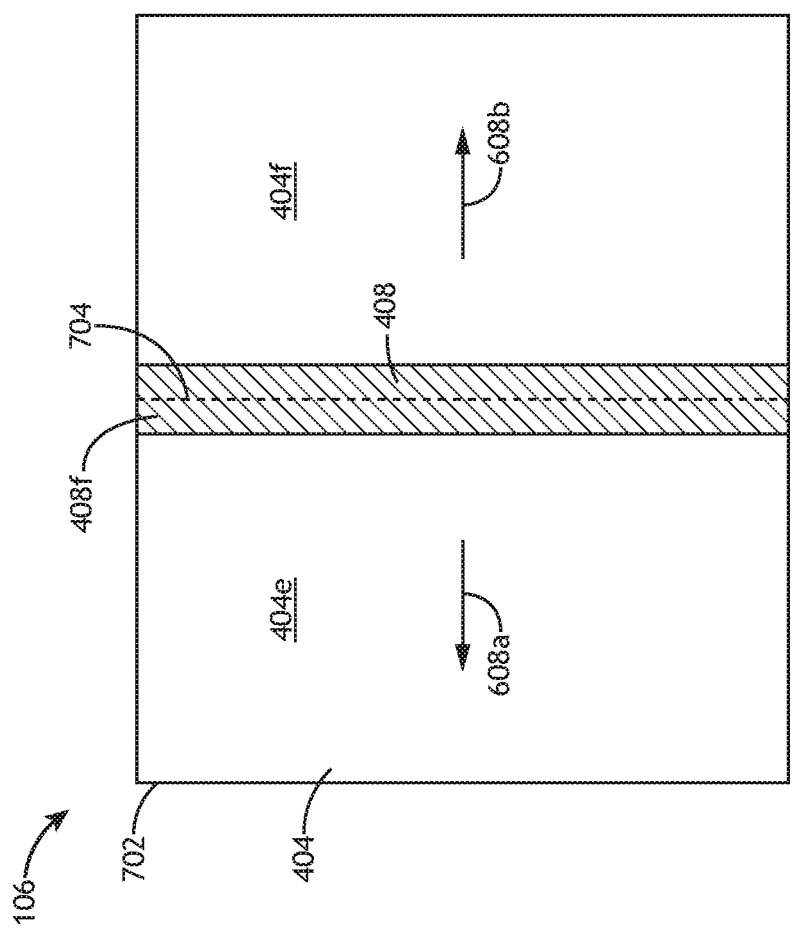
FIG. 7 is a display map including two display fields defining an offset direction for each display field configured in accordance with inventive concepts disclosed herein.

Referring now to FIGS. 6A through 7, the behavior of cursors 302 suitable for multiple simultaneous touch points 304 are described herein. Accordingly, cursors 302 based on multiple touch points 304 may be suitable for providing multi-touch functionality. The cursors 302 of FIGS. 6A-6B may be implemented in and may function in substantially the same manner as the cursors 302 in FIGS. 3A-3B except for the number of touch points 304 used to determine the location of the selection point 306. For example, a cursor 302 suitable for multi-touch operation may include any number of graphical objects to visualize the selection point 306 and/or any of the touch points 304. Accordingly, the specific illustrations of graphical objects in FIGS. 6A-6B are provided solely for illustrative purposes and should not be interpreted as limiting.

FIG. 6A is a schematic view of a cursor 302 providing visualization of a selection point 306 offset from two touch points 304 (e.g., touch points 304a-304b) in accordance with inventive concepts disclosed herein. In some embodiment, the selection point 306 is determined (e.g., by the cursor display sub-system 112) to be at a location equidistant from each of the touch points 304. For example, as illustrated in FIG. 6A, the selection point 306 may be located halfway between a first touch point 304a and a second touch point 304b). Accordingly, the selection shape 318 may not be obscured by the touch points 304a-304b.

FIG. 6B is a schematic view of a cursor 302 providing visualization of a selection point 306 offset from two touch points 304 (e.g., touch points 304a-304b) and further including a map-dependent lateral offset distance 602 configured in accordance with inventive concepts disclosed herein. The cursor 302 of FIG. 6B may be implemented and may function substantially similarly to the cursor 302 of FIG. 6A except for the lateral offset distance 602. For example, the selection point 306 may be determined to be along a line 604 defining points equidistant from the touch points 304a-304b.

In some embodiments, the direction of the lateral offset distance 602 from a connection line 606 connecting the touch points 304a-304b (e.g., an offset direction 608) may be dynamically determined based on a display map. FIG. 7 is a display map 702 including two display fields 404 defining an offset direction 608 for each display field 404 configured in accordance with inventive concepts disclosed herein. The display map 702 may be implemented and may function substantially similarly to the display map 402 of FIG. 4, but may have a different configuration of display fields 404. For example, the display map 702 may include a first display field 404e and a second display field 404f on opposite sides of a vertical centerline 704. Further, the first display field 404e may define a first offset direction 608a away from the vertical centerline 704 (e.g., leftward based on the orientation of FIG. 7) and the second display field 404f may define a second offset direction 608b away from the vertical centerline 704 (e.g., rightward based on the orientation of FIG. 7). The display map 402 of FIG. 7 may be suitable for, but is not limited to, defining the offset direction 608 for the cursor 302 of FIG. 6B. The offset direction 608 (e.g., 608a or 608b) with respect to the connection line 606 may thus be dynamically updated based on which of the first display field 404e or the second display field 404f includes the touch points 304.

In some embodiments, the display map 702 includes a transition zone 408f that may operate substantially similar to the transition zones 408 described in the context of FIG. 4. Accordingly, the relationship between the selection point 306 and the touch points 304a-304b may vary according to any selected manner in the transition zones 408. For example, the offset direction 608 may remain constant as the touch point 304 moves out of a display field 404 (e.g., any of display fields 404e-404f) and into the transition zone 408f and may update once the touch points 304a-304b enters a different display fields 404. By way of another example, the cursor display sub-system 112 may dynamically update the offset direction 608 when the touch points 304a-304b are within the transition zone 408f based on the location of the touch points 304a-304b in the transition zone 408a.

In some embodiments, the lateral offset distance 602 may be adjustable based on the separation between the touch points 304a-304b, which may provide flexibility and precision for selection of displayed content near the edges of display element 106. For example, the lateral offset distance 602 may increase as the separation between the touch points 304a-304b decreases. In this regard, the user may "pinch" the touch points 304a-304b to increase lateral offset distance 602 and avoid obscuration of the selection point 306.

Figure 8:
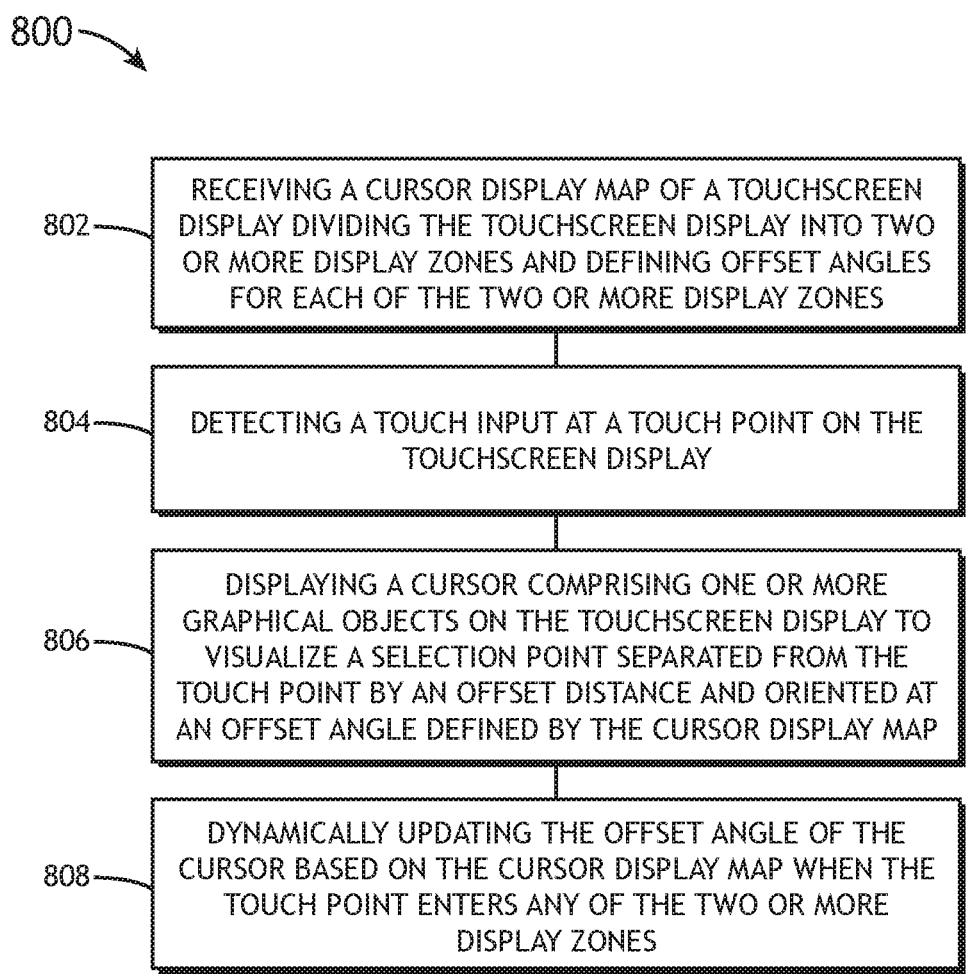
FIG. 8 is a flow chart illustrating a method for providing an offset cursor configured according to the inventive concepts disclosed herein.

Referring now to FIG. 8, an exemplary embodiment of a method according to the inventive concepts disclosed herein may include one or more of the following steps. The method 800 may be utilized to provide an offset cursor. The embodiments and enabling technologies described previously herein in the context of the touchscreen display system 100 should be interpreted to extend to method 800. However, the method 800 is not limited to the architecture of the touchscreen display system 100.

A step 802 may include receiving a cursor display map of a touchscreen display dividing the touchscreen display into two or more display zones and defining offset angles for each of the two or more display zones. The touchscreen display may be received from any source. For example, the display map may be received from a local memory medium, from a remote server, or the like.

In some embodiments, the display map defines offset angles based on a reference direction. For example, the reference direction may be, but is not required to be, associated with a vertical direction based on a typical user experience.

A step 804 may include detecting a touch input at a touch point on the touchscreen display. A touchscreen display may include any type of touchscreen technology for detecting one or more touch inputs. For example, the touchscreen display may include components for implementing resistive touchscreen input measurements, capacitive touchscreen input measurements, infrared touchscreen input measurements, optical imaging input measurements, surface-acoustic wave (SAW) touchscreen input measurements, or acoustic pulse recognition (ACR) touchscreen input measurements.

A step 806 may include displaying a cursor comprising one or more graphical objects on the touchscreen display to visualize a selection point separated from the touch point by an offset distance and oriented at an offset angle defined by the cursor display map. For example, upon detection of one or more touch points, the step 806 may include determining a location of the selection point offset from the one or more touch points suitable for visualizing the selection point without obscuration by user input devices (e.g., fingers, one or more styli).

The cursor may include any number of graphical objects suitable for visualizing the selection point. Further, the cursor may include, but is not required to include, any number of graphical objects suitable for visualizing the one or more touch points. For example, the cursor may include a selection shape (e.g., a circle, a triangle, a square, or a hexagon) centered on the selection point. By way of another example, the cursor may include crosshairs intersecting at the selection point. By way of another example, the cursor may include an arrow pointing from a selection point to the selection point.

In some embodiments, the selection point may be determined based on multiple simultaneous touch points to provide a multitouch experience. For example, a cursor may include graphical objects (e.g., a selection shape or crosshairs) to visualize the selection point located at a point equidistant from the multiple touch points.

In the case of two touch points, a selection point may be, but is not required to be, provided along a line defining locations equidistant from the two touch points. Further, an offset direction (e.g., a direction in which the selection point deviates from a line connecting the two touch points) may be defined by the display map.

A step 808 may include dynamically updating the offset angle of the cursor based on the cursor display map when the touch point enters any of the two or more display zones. In this regard, as user interacts with various portions of the touchscreen display (e.g., by dragging a user input device across the display), step 808 may include dynamically updating the orientation of the selection point with respect to the touch points.

For example, the offset angles defined by the display map in step 804 may be oriented such that the selection point is situated in a direction away from a central point of the touchscreen display. Accordingly, step 808 may include dynamically updating the cursor to orient the selection point towards the edges of the touchscreen display to facilitate user selection of displayed content near the edges of the display.

In some embodiments, the display map may further include one or more transition zones to facilitate user interaction with displayed content near boundaries of display fields 404. For example, the display map may include transition zones located between display fields.

The relationship between the selection point and the touch point may vary according to any selected manner in the transition zones. For example, the offset angle of the cursor may remain constant as the touch point moves out of a display field and into a transition zone 408. Further, the offset angle of the cursor may update once the touch point enters a different display field. The transition zones may thus provide flexible boundaries between display fields in which the offset angle in a transition zone is based on the direction from which the touch point enters the transition zone. By way of another example, the offset angle in a transition zone may smoothly transition between offset angles of adjacent display fields. For instance, the value of the offset angle in a transition zone may have a value (e.g., a transition value) that depends on the distances to the boundaries of the adjacent display fields. Further, the transition behavior may be the same for all transition zones or may vary for different transition zones. For example, transition zones between corners of display fields may provide different transition behavior than transition zones between edges of display fields.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A touchscreen display device comprising:
a touchscreen display; and
a controller including one or more processors configured to execute program instructions causing the one or more processors to:
receive a cursor display map of the touchscreen display, wherein the cursor display map divides the touchscreen display into two or more display zones, wherein the cursor display map defines offset angles for each of the two or more display zones;

detect a touch input at a touch point on the touchscreen display;

display a cursor comprising one or more graphical objects on the touchscreen display, wherein the cursor includes a selection point separated from the touch point by an offset distance from the touch point and oriented at an offset angle defined by the cursor display map, wherein an initial offset angle is determined from the cursor display map based on a display zone of the two or more display zones closest to or including the touch point; and dynamically update the offset angle of the cursor based on the cursor display map when the touch point enters any of the two or more display zones.

2. The touchscreen display device of claim 1, wherein the display map further divides the touchscreen display into two or more display zones separated by transition zones, wherein the one or more processors are further configured to execute program instructions causing the one or more processors to:

retain the offset angle of the cursor when the touch point moves from a display zone of the two or more display zones into one of the transition zones to facilitate selection of edges of the display zone.

3. The touchscreen display device of claim 1, wherein the display map further divides the touchscreen display into two or more display zones separated by transition zones, wherein the one or more processors are further configured to execute program instructions causing the one or more processors to:

dynamically modify the offset angle of the cursor, when the touch point is located within any of the transition zones, to a transition value between values defined by adjacent display zones of the two or more display zones.

4. The touchscreen display device of claim 3, wherein the transition value gradually shifts between the values defined by the adjacent display zones based on the location of the touch point relative to the boundaries of the adjacent display zones.

5. The touchscreen display device of claim 1, wherein the touchscreen display comprises:

at least one of a resistive touchscreen display or a capacitive touchscreen display.

6. The touchscreen display device of claim 1, wherein the offset angles for a display zone of the two or more display zones defined by the cursor display map correspond to an angle of the display zone with respect to a center of the touchscreen display.

7. The touchscreen display device of claim 1, wherein the touchscreen display accepts the touch input from at least one of a finger of a user or a stylus.

8. The touchscreen display device of claim 1, wherein the cursor comprises:

a graphical object shaped as an arrow pointing from the touch point to the selection point.

9. The touchscreen display device of claim 1, wherein the cursor comprises:

a graphical object including a circle centered on the selection point, wherein content displayed on the touchscreen display at the selection point is visible through the circle.

10. The touchscreen display device of claim 1, wherein a release of the touch input initiates a selection event at the selection point.

11. The touchscreen display device of claim 1, further comprising:

a user input device, wherein an input on the user input device initiates a selection event at the selection point.

12. A multi-touch touchscreen display device comprising:

a touchscreen display; and a controller including one or more processors configured to execute program instructions causing the one or more processors to:

receive a cursor display map of the touchscreen display, wherein the cursor display map divides the touchscreen display into two or more display zones separated by transition zones, wherein the cursor display map defines offset directions for each of the two or more display zones;

detect a touch input at two touch points on the touchscreen display;

display a cursor comprising one or more graphical objects on the touchscreen display, wherein the cursor includes a selection point separated from the two touch points, wherein the selection point is located equidistant from the two touch points and separated from a midpoint between the two touch points by an offset distance and in a lateral offset direction defined by the cursor display map, wherein the offset distance is based on a separation distance between the two touch points, wherein decreasing the separation distance between the two touch points increases the offset distance; and dynamically update the offset direction of the cursor based on the cursor display map when one of the two touch points enters any of the two or more display zones.

13. The touchscreen display device of claim 12, wherein the cursor comprises:

a graphical object including a circle centered on the selection point, wherein content displayed on the touchscreen display at the selection point is visible through the circle.

14. The touchscreen display device of claim 12, wherein a release of the touch input initiates a selection event at the selection point.

15. A method comprising:

receiving a cursor display map of a touchscreen display, wherein the cursor display map divides the touchscreen display into two or more display zones, wherein the cursor display map defines offset angles for each of the two or more display zones;

detecting a touch input at a touch point on the touchscreen display;

displaying a cursor comprising one or more graphical objects on the touchscreen display, wherein the cursor includes a selection point separated from the touch point by an offset distance and oriented at an offset angle defined by the cursor display map, wherein an initial offset angle is determined from the cursor display map based on a display zone of the two or more display zones closest to or including the touch point; and updating the offset angle of the cursor dynamically based on the cursor display map when the touch point enters any of the two or more display zones.

16. The method of claim 15, wherein the display map further divides the touchscreen display into two or more display zones separated by transition zones, wherein the method further comprises:

retaining the offset angle of the cursor when the touch point moves from a display zone of the two or more display zones into one of the transition zones to facilitate selection of edges of the display zone.

17. The method of claim 15, wherein the display map further divides the touchscreen display into two or more display zones separated by transition zones, wherein the method further comprises:

dynamically modifying the offset angle of the cursor, when the touch point is located within any of the transition zones, to a transition value between values defined by adjacent display zones of the two or more display zones.

18. The method of claim 17, wherein dynamically modifying the offset angle of the cursor, when the touch point is located within any of the transition zones, to a transition value between values defined by adjacent display zones of the two or more display zones comprises:

dynamically shifting the transition value gradually shifts between the values defined by the adjacent display zones based on the location of the touch point relative to the boundaries of the adjacent display zones.

* * * * *